(12) United States Patent
Malarky

(10) Patent No.: US 10,521,619 B2
(45) Date of Patent: Dec. 31, 2019

(54) METHOD AND RFID READER FOR OBTAINING A BACKSCATTER MODULATED RECEIVE SIGNAL

(71) Applicant: Kapsch TrafficCom AG, Vienna (AT)

(72) Inventor: Alastair Malarky, Petersburg (CA)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 16/003,893

(22) Filed: Jun. 8, 2018

(65) Prior Publication Data
US 2018/0373904 A1    Dec. 27, 2018

(30) Foreign Application Priority Data
Jun. 21, 2017 (EP) ..................... 17177034

(51) Int. Cl.
*G06K 7/00* (2006.01)
*H04B 1/525* (2015.01)

(52) U.S. Cl.
CPC ........... *G06K 7/0008* (2013.01); *H04B 1/525* (2013.01)

(58) Field of Classification Search
CPC ...... G06K 7/0008; G06K 7/0004; G06K 7/00; G06K 7/10009; H04B 1/50; H04B 1/525; H04B 5/0037; H04B 5/0062; H04B 5/0075
USPC ..................................... 340/10.3
See application file for complete search history.

(56) References Cited

U.S. PATENT DOCUMENTS

| | | | |
|---|---|---|---|
| 6,603,391 B1 | 8/2003 | Greeff et al. | |
| 6,745,018 B1* | 6/2004 | Zehavi | H04B 1/123 455/278.1 |
| 8,154,386 B2* | 4/2012 | Kim | H04B 5/0062 340/10.1 |
| 8,164,455 B2* | 4/2012 | Fukuda | G06K 7/0008 340/10.1 |
| 9,900,060 B1* | 2/2018 | Keehr | H04B 5/0062 |
| 2006/0098765 A1 | 5/2006 | Thomas et al. | |
| 2007/0290806 A1* | 12/2007 | Greeff | G01S 13/751 340/10.1 |

(Continued)

FOREIGN PATENT DOCUMENTS

EP        2808825 A1    12/2014

OTHER PUBLICATIONS

Extended European Search report received for European Patent Application No. 17177034.0, dated Dec. 19, 2017, 6 pages.

*Primary Examiner* — Emily C Terrell
(74) *Attorney, Agent, or Firm* — Fiala & Weaver P.L.L.C.

(57) ABSTRACT

The disclosed subject matter relates to a method for obtaining a backscatter modulated receive signal in an radio-frequency identification (RFID) system, comprising the steps: providing a carrier wave by a local oscillator; generating a transmit signal based on the carrier wave and an input signal; transmitting said transmit signal; receiving a backscatter modulated receive signal; and combining the receive signal with a cancel signal; wherein the method further comprises the step of determining a phase shift and an amplitude adjust from the corrected receive signal; wherein the determined phase shift is applied as a phase rotation when generating the transmit signal; and wherein the cancel signal is based on the un-shifted carrier wave and the determined amplitude adjust. The disclosed subject matter further relates to an RFID reader configured to perform said method.

15 Claims, 3 Drawing Sheets

(56) References Cited

U.S. PATENT DOCUMENTS

Figure 1:
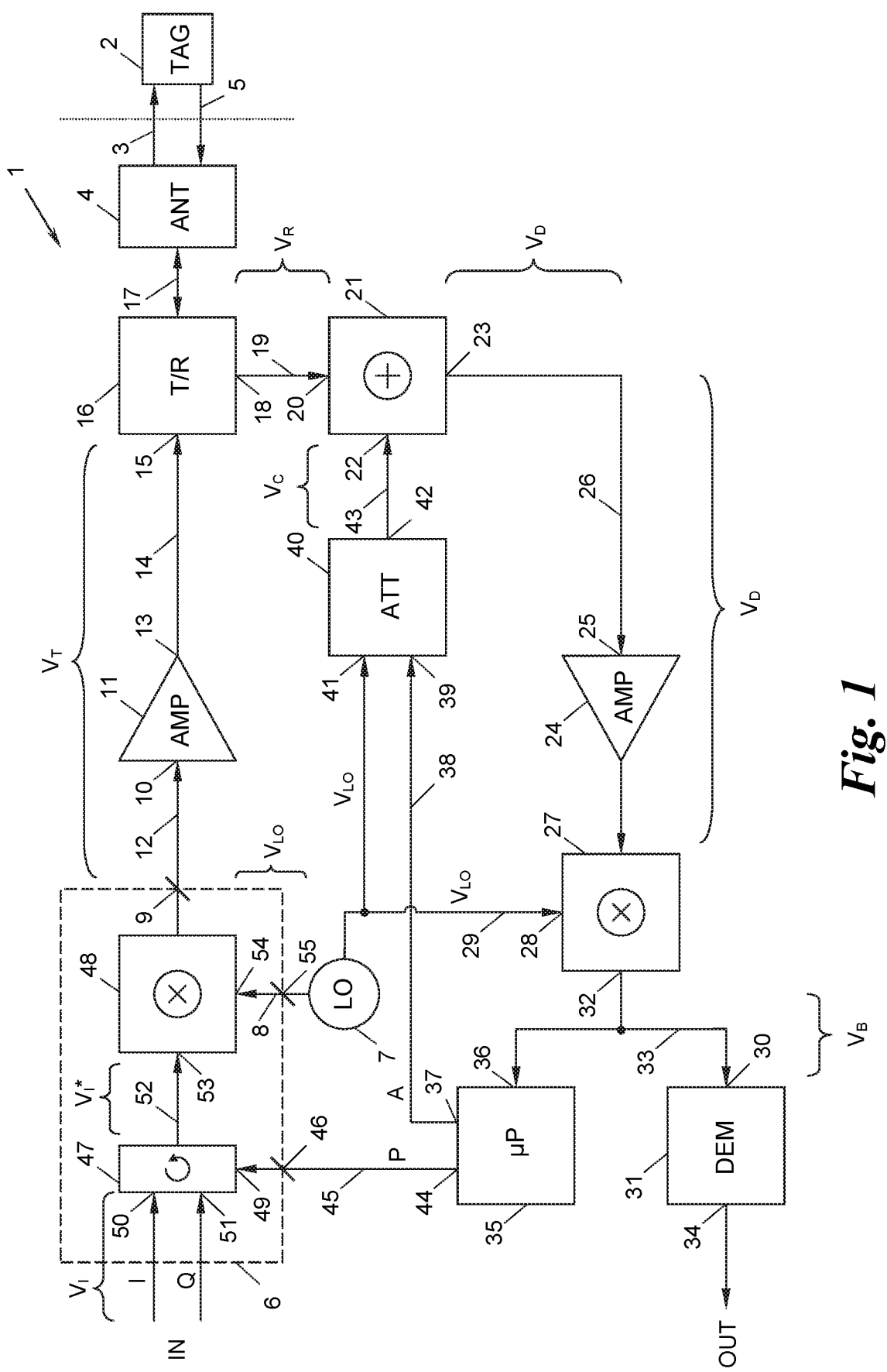

2008/0041953 A1* 2/2008 Frederick ............. G06K 7/0008
  235/451
2008/0079547 A1   4/2008 Alicot et al.
2009/0130981 A1   5/2009 Nagai et al.
2018/0254883 A1* 9/2018 Mitsugi .................... H04B 1/18

* cited by examiner

METHOD AND RFID READER FOR OBTAINING A BACKSCATTER MODULATED RECEIVE SIGNAL

CROSS-REFERENCE TO RELATED APPLICATION/S

This application claims priority to European Patent Application No. 17 177 034.0, filed on Jun. 21, 2017, which is herein incorporated by reference in its entirety.

BACKGROUND

Technical Field

The subject matter relates to a method for obtaining a backscatter modulated receive signal as well as an RFID reader for obtaining a backscatter modulated receive signal.

Background Art

In a backscatter-based RFID ("radio-frequency identification") system, a reader wirelessly interrogates nearby transponders or tags by broadcasting an information signal. To this end, the reader may modulate a carrier wave to transmit information. In turn, transponders that receive this interrogation signal reply by modulating this very same wave, e.g., by modulating the impedance of their receive antennas, and returning ("backscattering") the modulated wave. This process is known in the art as backscatter modulation.

The quality of the signal received in the reader can vary depending on the noise caused by the reader in its transmit or receive path, the coupling of the transmit signal into the receive path within the reader, or by reflections of the transmit signal at objects between the antenna of the reader and the transponder, all referred to as leakage. Various measures are known in the state of the art to reduce such leakage. For example, readers that can improve the quality of a received signal by adding a phase coherent cancel signal to a received signal to compensate for leakage are known in the art, e.g., from EP 2 808 825 A1 and US 2009/130981 A1.

EP 2 808 825 A1 discloses a system in which an error signal is determined from a received signal. This system uses a cancel modulator, which generates a cancel signal by modulating said error signal onto a carrier wave from a local oscillator. However, this cancel modulator, as well as a subsequent amplification of the error signal, inject amplified uncorrelated noise into the receiver path. If this noise is large enough, the noise figure of the receiver can be significantly degraded and the benefits of the cancellation can even be negated.

US 2009/0130981 A1 shows a system in which the cancel signal is based solely on the carrier wave. The carrier wave is attenuated and phase shifted by a variable amount and combined with the received signal to suppress a leakage signal from the transmission side included in the received signal. However, the drawback of this approach is that a high-power phase shifter with a significant number of quantization bits is required. E.g., for 30 dB cancellation, 8 bits of each amplitude (dB) and phase control (deg) are required. Such phase shifters are very expensive and not always readily available.

BRIEF SUMMARY

The object of the disclosed subject matter is to overcome the restraints of the art and provide a method and an RFID reader for obtaining a backscatter modulated receive signal that do not require the unfavourable hardware elements as set out above.

To this end, in a first aspect the disclosed subject matter provides a method for obtaining a backscatter modulated receive signal in an RFID system, comprising the steps: providing a carrier wave by a local oscillator; generating a transmit signal based on the carrier wave and an input signal; transmitting said transmit signal; receiving a backscatter modulated receive signal in response to the transmit signal; and combining the receive signal with a cancel signal to obtain a corrected receive signal; wherein the method further comprises the step of determining a phase shift and an amplitude adjust from the corrected receive signal; wherein the determined phase shift is applied as a phase rotation when generating the transmit signal; and wherein the cancel signal is based on the un-shifted carrier wave and the determined amplitude adjust.

According to the disclosed subject matter, the cancel signal is generated by only attenuating the carrier wave according to the determined amplitude adjust and not phase-shifting the carrier wave. The phase shift between the carrier wave used for transmitting and the carrier wave used for the cancel signal is generated by a phase rotation of the transmit signal rather than a phase rotation of the cancel signal. In this way, a high power local oscillator can be used and only little to no added thermal noise is injected into the cancel path.

With respect to the first state of the art outlined above, no complex modulator is used in the cancel path such that the thermal noise problem caused by such a complex modulator is solved. Compared to the second state of the art outlined above, no costly high-power phase shifters are necessary.

The disclosed subject matter is based on the idea that phase rotation and attenuation can be used not only in physically distinct locations within the reader but also in entirely different sections of the reader, namely once in the transmit section and once in the cancel path of the receive section. As a result, the cancel signal is phase rotated with respect to the carrier wave of the transmit signal even though the cancel signal has not been phase shifted itself.

Optionally, the transmit input signal is provided as an in-line and as a quadrature input. By utilizing in-phase and quadrature components, so-called I&Q components, a complex modulation and complex demodulation can be employed to increase the amount of data to be transmitted. This is mandatory for the first embodiment described below and advantageous for the second and third embodiment.

There are three embodiments of the disclosed subject matter pertaining to the phase rotation of the transmit signal:

In a first embodiment, the phase rotation is performed by phase rotating the in-line and quadrature inputs. Such a complex (in-line and quadrature) phase rotation is simple to implement and thus uses the least resources. The transmit signal can then be generated by modulating the carrier wave with the phase rotated input signals.

Optionally, the rotation of the in-line and quadrature inputs is performed digitally such that a processor can be used for this operation. This yields the qualitatively best result with the least usage of resources.

In a second embodiment, the phase rotation is performed by phase rotating the carrier wave provided by the local oscillator to generate a phase-shafted carrier wave, and a modulator generates the transmit signal by modulating the phase-shifted carrier wave with the input signal. Here, the phase shifter operates at much lower power than in the state of the art where the phase rotation is performed to obtain the cancel signal. The transmit signal can then be generated by modulating the phase rotated carrier wave with the input signal. This embodiment has the added advantage that not necessarily a complex transmit modulator is used.

In a third embodiment, a modulator generates a provisional transmit signal by modulating the carrier wave with the input signal, and the phase rotation is performed by phase rotating the provisional transmit signal as output by the modulator to generate the transmit signal. The advantages of the second embodiment hold here, too.

In all embodiments it is possible that, before transmitting the transmit signal, the transmit signal is amplified and the phase rotation occurs before amplifying said transmit signal. This reduces the performance need of the phase shifter.

In a second aspect, the disclosed subject matter provides for an RFID reader for obtaining a backscatter modulated signal, comprising: a local oscillator configured to provide a carrier wave; a transmit signal generation device configured to generate a transmit signal based on the carrier wave and an input signal; a transmitter configured to transmit said transmit signal; a receiver configured to receive a backscatter modulated receive signal in response to the transmit signal; and a combiner configured to combine the receive signal with a cancel signal to obtain a corrected receive signal; wherein the RFID reader further comprises a processor configured to determine a phase shift and an amplitude adjust from the corrected receive signal; wherein the transmit signal generation device comprises a phase shifter, which is configured to apply the determined phase shift as a phase rotation when generating the transmit signal; and wherein an attenuator is configured to generate the cancel signal based on the un-shifted carrier wave and the determined amplitude adjust.

This RFID reader has the same advantages as the method outlined above.

Optionally, the transmit signal generation device is configured to receive an in-line and a quadrature input. This is mandatory for the first embodiment described below and advantageous for the second and third embodiment.

In a first embodiment, the phase shifter is configured to apply the determined phase shift by rotating the in-line and quadrature inputs of the transmit signal generation device. The reader here further comprises a modulator which is configured to generate the transmit signal by modulating the carrier wave with the phase rotated input signal.

In this embodiment, the phase shifter can be embodied as a processor, which is configured to digitally rotate the in-line and quadrature inputs of the transmit signal generation device.

In a second embodiment, the phase shifter is configured to perform the phase rotation by rotating the carrier wave provided by the local oscillator to generate a phase-shafted carrier wave, and a modulator is configured to generate the transmit signal by modulating the phase-shifted carrier wave with the input signal. The reader here comprises a modulator which is configured to generate the transmit signal by modulating the phase rotated carrier wave with the input signal.

In a third embodiment, the transmit signal generation device comprises a modulator, which is configured to generate a provisional transmit signal by modulating the carrier wave with the input signal, and the phase shifter is configured to perform the phase rotation by phase rotating the provisional transmit signal to obtain the transmit signal.

In all of the three embodiments, the reader can further comprise an amplifier, which is configured to amplify the transmit signal after the phase rotation is applied and before the transmit signal is transmitted.

Optionally, a downconverter is arranged between the combiner and the processor, wherein the downconverter is configured to receive the carrier wave from the local oscillator or the phase shifted carrier wave from the phase shifter to downconvert the corrected receive signal. By means of this, the processor can calculate the phase shift and amplitude adjust from the baseband signal.

All advantages of the embodiments and variants of the method as described above also hold for the RFID reader.

BRIEF DESCRIPTION OF THE DRAWINGS/FIGURES

Figure 2:
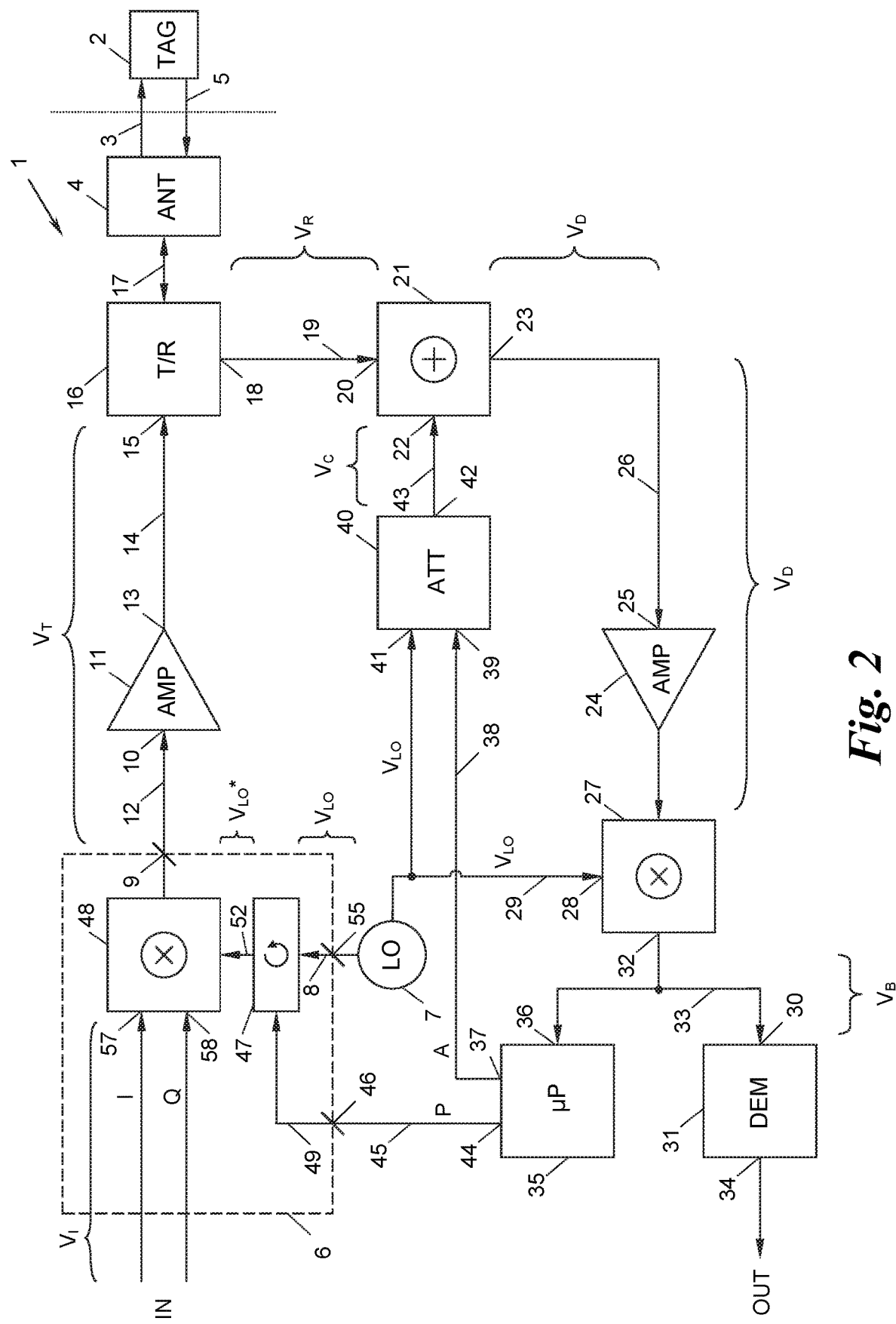
Figure 3:
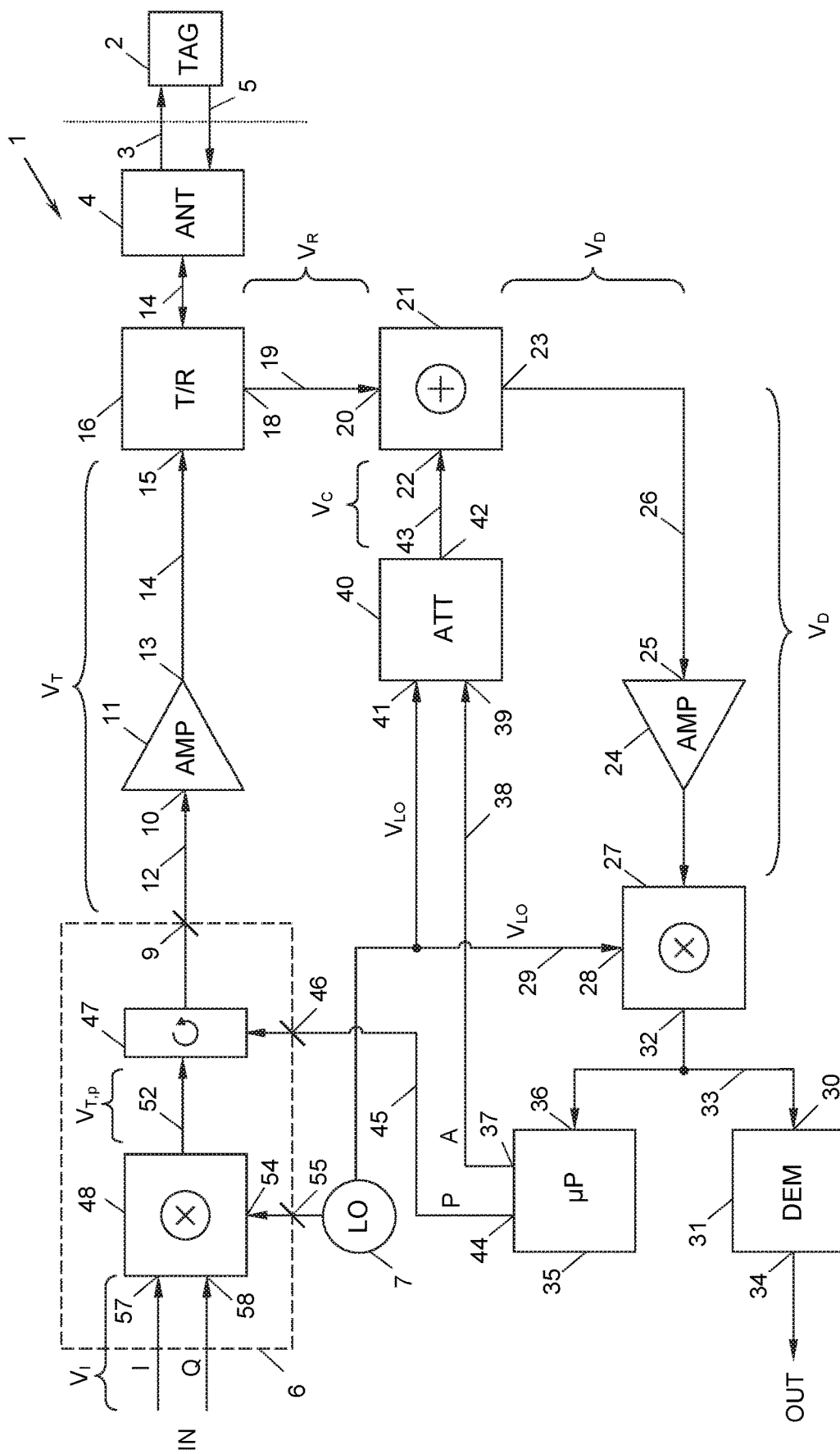

The disclosed subject matter shall now be explained in more detail below on the basis of embodiments thereof with reference to the accompanying drawings, in which:

FIG. 1 is a block diagram of an RFID reader according to a first embodiment of the disclosed subject matter, FIG. 2 is a block diagram of an RFID reader according to a second embodiment of the disclosed subject matter, and FIG. 3 is a block diagram of an RFID reader according to a third embodiment of the disclosed subject matter.

DETAILED DESCRIPTION

FIG. 1 shows an RFID reader 1 for communicating with RFID transponders or tags 2. The communication between the reader 1 and the tags 2 is based on RFID ("radio-frequency identification") backscatter modulation, meaning that the reader 1 emits an information signal 3 over an antenna 4, and the tag 2 modulates the received information signal 3, e.g., by switching an antenna of the tag 2 between a short-circuit condition and an open-circuit condition to change a reflective/absorptive characteristic of a load as seen by the information signal 3 to return a modulated signal 5 to the reader 1. Some backscatter transponders 2, called "passive" RFID tags, lack an internal power source, like a battery, and rely upon the energy of the received information signal 3 to power the transponder circuitry. On the other hand, so-called active RFID tags, which have their own power source, e.g., a battery, may be used, too.

After a tag 2 has modulated the information signal 3 and "backscattered" it to the reader 1 as the modulated signal 5, the modulated signal 5 can be detected by the reader 1 via an antenna, which can be the same antenna 4 or a different antenna as used for transmission. In this manner, communication is established between the reader 1 and a tag 2. Of course, multiple tags 2 may each answer a single information signal 3 with a modulated signal 5, and the reader 1 can be configured to receive and evaluate each received modulated signal 5.

To generate the information signal 3, a transmit signal generation device 6 receives ("IN") and modulates an input signal $V_I$, which comprises data to be transmitted to the tags 2, onto a carrier wave or carrier signal $V_{LO}$ provided by a local oscillator 7 via a connection 8. Here, the input signal $V_I$ consists of an in-line component I and a quadrature component Q, for purposes which will be described below in detail. The input signal $V_I$ specifies data to be transmitted from the reader 1 to the tag 2, e.g., data to be stored in the tag 2 or commands to perform certain actions.

The transmit signal generation device 6 outputs the resulting signal as a transmit signal $V_T$ at an interface 9 to an input 10 of an amplifier 11 via a connection 12. The amplifier 11 amplifies the transmit signal $V_T$ to an appropriate level for transmission. The amplifier 11 outputs the amplified transmit signal $V_T$ at an output 13 via a connection 14 to an input 15 of a transceiver 16. The transceiver 16 is configured to transmit the transmit signal $V_T$ via the antenna 4 to the tag 2 and is for this purpose connected to the antenna 4 via a connection 17.

The whole communication path starting from providing the input signal $V_I$ to transmitting the information signal 3 is referred to as the transmit path. Each of the components transmit signal generation device 6, amplifier 10, and transceiver 16 generate noise, which negatively impacts the quality of the transmitted signal. In addition, the quality of the received modulated signal 5 can rely on further factors such as, for example, reflections ("leakage") in the path 17 between transceiver 16 and antenna 4, if the same antenna is used for transmitting and receiving, or at a coupling of multiple antennas if different antennas are used for transmitting and receiving, or at the coupling between the transmit and receive path at connection 19. Furthermore, reflections from objects between the antenna 4 and the tag 2 can cause additional leakage. Therefore, a received modulated signal 5 has to be optimized with respect to noise and compensated for leakage, as will be explained below.

After receiving a modulated signal 5 from a tag 2, the signal is transferred by said antenna 4 to the transceiver 16. As can be seen, the transceiver 16 is the same for transmitting and receiving signals from and to the reader 1. For this purpose, a circulator or coupler may be used in the antenna stage of the transceiver to split and receive signals 3 and 5, respectively. A separate transmitter and receiver can be employed instead of a transceiver (not shown).

The transceiver 16 outputs the modulated signal 5 as a receive signal $V_R$ at an output 18 via a connection 19 to an input 20 of a combiner 21 ("summer"), which subtracts (or adds, depending on the sign) a cancel signal $V_C$ provided at a second input 22 of the combiner 21 from the receive signal $V_R$. The combiner 21 in turn outputs the subtracted signal at an output 23 as a corrected receive signal $V_D$, which is here defined as $$V_D = V_R - V_C.$$

For further processing, a low noise amplifier 24 receives the corrected signal $V_D$ from the output 23 of the combiner 21 at an input 25 via a connection 26. Downstream of the amplifier 24, a downconverter 27 is provided to downconvert the corrected signal $V_D$ to a baseband signal $V_B$ using the carrier wave $V_{LO}$, which it receives at an input 28 from the local oscillator 7 via a connection 29. Alternatively, the downconverter 27 can also receive a phase-shifted carrier wave from a phase shifter, the purpose of which will be described below.

The baseband signal $V_B$ can in turn be demodulated in accordance with a modulation scheme as used by the RFID system. To this end, an input 30 of a demodulator 31 is connected to an output 32 of the downconverter 27 via a connection 33. The demodulator 31 may for this purpose include a bandpass filter to remove any residual echo or leakage signal. The output of the demodulator 31 includes the information that has been modulated onto the information signal 3 by the tag 2. The demodulator 31 outputs the information at an output 34 for further processing ("OUT").

The path between the output 18 of the transceiver 16 and the output 34 of the demodulator 31 is called the receive path. Again, noise caused in the receive path is to be kept low.

To generate the cancel signal $V_C$ fed into the input 22 of the combiner 21, a processor 35 receives the downconverted corrected signal $V_B$ from the downconverter 27. To facilitate this, an input 36 of the processor 35 can be connected to a switch or splitter within the connection 33. Alternatively, the downconverter 27 can have a further output that is connected to the input 36 of the processor 35 (not shown).

From the received downconverted corrected signal $V_B$, the processor 35 determines an amplitude adjust A and a phase shift P to generate a suitable cancel signal $V_C$ as will be detailed below.

Optionally, a lowpass filter can be arranged upstream of the processor 35, i.e., between the downconverter 27 and the processor 35 but not in the path of the demodulator 31, to remove the modulated transponder information in the sideband so as to obtain a signal that is representative of the downconverted leakage signal.

The processor 35 forwards the amplitude adjust A via an output 37 and a connection 38 to a first input 39 of an attenuator 40. The attenuator 40 receives the carrier wave $V_{LO}$ from the local oscillator 7 at a second input 41. The attenuator 40 in turn adjusts the amplitude of the carrier wave $V_{LO}$ according to the received amplitude adjust A to therefrom generate the cancel signal $V_C$, which is fed to the input 22 of the combiner 21 via an output 42 and a connection 43.

The path between the output 37 of the processor 35 up to the input 22 of the combiner 21 is referred to as the cancel path.

Similarly, the processor 35 forwards the determined phase shift P via an output 44 and a connection 45 to an interface 46 of the transmit signal generation device 6 to provide a phase rotation in the transmit path. To this end, the transmit signal generation device 6 comprises a phase shifter 47 ahead of a modulator 48. The phase shifter 47 receives the phase adjust P at an input 49 via the interface 46 of the transmit signal generation device 6. In the embodiment of FIG. 1, the phase shifter 47 receives the in-line and quadrature components I, Q of the input signal $V_I$ at inputs 50, 51. For example, the in-line and quadrature components can be digitally rotated in the complex plane by means of a processor, which can be the same or a different processor to the one that determines the phase shift P and amplitude adjust A. The resulting signal as output by the phase shifter 47, i.e., the phase-shifted input signal $V_I^*$, can be defined as $$V_I^* = P \times V_I.$$

The phase shifter 47 forwards the phase-shifted input signal $V_I^*$ via a connection 52 to the modulator 48, which generates the transmit signal $V_T$ by modulating the phase-shifted input signal $V_I^*$, received via a first input 53, onto the carrier wave $V_{LO}$, received from the local oscillator 7 via a second input 54 over an interface 55. The transmit signal $V_T$ can be defined as $$V_T = V_I^* \times V_{LO} = P \times V_I \times V_{LO}.$$

After modulation, the modulator 48 outputs the transmit signal $V_T$ at the interface 9 of the transmit signal generation device 6 to transmit it as detailed above.

It can be seen that the correction parameters determined by the processor 35, namely the phase shift P and the amplitude adjust A, are not both used in the same signal path, but the phase shift is applied in the transmit path and the amplitude adjust A is applied in the cancel path.

The determination of the amplitude adjust A and the phase shift P can be performed as known in the state of the art, for example as disclosed in US 2009/0130981 A1.

One possibility to determine the most suitable phase shift P and amplitude adjust A is to use an input signal $V_I$ with no or only a predetermined information as well as a zero phase shift, i.e., the transmit signal $V_T$ is substantially equal to the carrier wave $V_{LO}$, such that the modulated signal 5 or receive signal $V_R$, respectively, contains no further information and only has the characteristics of the carrier wave $V_{LO}$. Since the received signal 5 is downconverted using the carrier wave $V_{LO}$ by the downconverter 32, the processor 35 can determine any leakage occurring in the transmit and/or receive path and therefrom a suitable phase shift P and amplitude adjust A, e.g., by comparison with predetermined data or an algorithm.

Further optionally, the processor 35 can iteratively test which phase shifts P and amplitude adjusts A most effectively reduce the leakage of the transmit path. It is stressed, however, that different approaches of determining the most suitable phase shift P and amplitude adjust A are viable, too.

FIG. 2 shows a second embodiment of the reader 1, wherein same reference signs denote the same components as in FIG. 1. All components of the reader 1 of FIG. 2 are basically the same as in FIG. 1, except for the transmit signal generation device 6.

The transmit signal generation device 6 of FIG. 2 receives an input signal $V_I$, which can again consist of an in-line and a quadrature component I, Q. However, here the input signal $V_I$ is not phase shifted, but the carrier wave $V_{LO}$ of the local oscillator is phase shifted with the phase shift P to generate a phase shifted carrier wave $V_{LO}^*$.

In more detail, the phase shifter 47 receives the phase shift P via the interface 46 of the transmit signal generation device 6 and receives the carrier wave $V_{LO}$ via the interface 55. The phase shifted carrier wave $V_{LO}^*$ can then be defined as $V_{LO}^* = P \times V_{LO}$.

The phase shifter 47 forwards the phase-shifted carrier wave $V_{LO}^*$ via the connection 52 to the modulator 48, which generates the transmit signal $V_T$ as a modulation of the phase-shifted carrier wave $V_{LO}^*$ and the input signal $V_I$ ("IN") received via inputs 57, 58. The transmit signal $V_T$ can then be defined as $V_T = V_{LO}^* \times V_I = P \times V_{LO} \times V_I$, which is substantially the same as in the embodiment of FIG. 1. The transmit signal $V_T$ is again output at interface 9.

In this embodiment, the phase-shifted carrier wave $V_{LO}^*$ can also be supplied from the phase shifter 47 to the downconverter 27. In any case, however, is the un-shifted carrier wave $V_{LO}$ supplied to the attenuator 40 in the cancel path.

FIG. 3 shows a third embodiment of the reader 1, wherein same reference signs denote the same components as in FIG. 1 and FIG. 2, respectively. All components of the reader 1 of FIG. 3 are basically the same as in FIG. 1, except for the transmit signal generation device 6.

The transmit signal generation device 6 of FIG. 3 receives an input signal $V_I$, which can again consist of an in-line and a quadrature component I, Q. However, here the input signal $V_I$ is not phase shifted with the phase shift P. Also, the carrier wave $V_{LO}$ of the local oscillator is not phase shifted as well.

Further, the modulator 48 directly receives the input signal $V_I$ at inputs 57, 58 as well as the carrier wave $V_{LO}$ from the local oscillator 7 via the interface 55 and generates the provisional transmit signal $V_{T,p}$, which can be defined as: $V_{T,p} = V_{LO} \times V_I$.

The modulator 48 then forwards the provisional transmit signal $V_{T,p}$ to the phase shifter 47 via the connection 52. Thus, the phase shifter 47 receives the provisional transmit signal $V_{T,p}$ as well as the phase shift P via the interface 46 from the processor 35. The phase shifter 47 shifts the provisional transmit signal $V_{T,p}$ by the amount specified by the phase shift P to generate the transmit signal $V_T$, which can be defined as: $V_T = P \times V_{T,p} = P \times V_{LO} \times V_I$, which is substantially the same as in the embodiments of FIG. 1 and FIG. 2. Again, the generated transmit signal $V_T$ is output at interface 9.

CONCLUSION

The disclosed subject matter is not restricted to the specific embodiments described in detail herein, but encompasses all variants, combinations and modifications thereof that fall within the framework of the appended claims.

What is claimed is:

1. A method for obtaining a backscatter modulated receive signal in a radio-frequency identification (RFID) reader, comprising:
   providing a carrier wave by a local oscillator of the reader;
   in a transmit path of the reader, generating a transmit signal based on the carrier wave and an input signal and transmitting said transmit signal;
   receiving a backscatter modulated receive signal in response to the transmit signal;
   combining the receive signal with a cancel signal to obtain a corrected receive signal; and
   determining a phase shift and an amplitude adjust from the corrected receive signal;
   wherein the determined phase shift is applied as a phase rotation in the transmit path; and
   wherein the cancel signal is based on the un-shifted carrier wave and the determined amplitude adjust.

2. The method according to claim 1, wherein the input signal is provided as an in-line and as a quadrature input.

3. The method according to claim 2, wherein the phase rotation is performed by phase rotating the in-line and quadrature inputs.

4. The method according to claim 3, wherein the phase rotation of the in-line and quadrature inputs is performed digitally.

5. The method according to claim 1, wherein the phase rotation is performed by phase rotating the carrier wave provided by the local oscillator to generate a phase-shifted carrier wave, and
   a modulator generates the transmit signal by modulating the phase-shifted carrier wave with the input signal.

6. The method according to claim 1, wherein a modulator generates a provisional transmit signal by modulating the carrier wave with the input signal, and
   the phase rotation is performed by phase rotating the provisional transmit signal as output by the modulator to generate the transmit signal.

7. The method according to claim 1, wherein before transmitting, the transmit signal is amplified and the phase rotation occurs before amplifying said transmit signal.

8. A radio-frequency identification (RFID) reader for obtaining a backscatter modulated signal, comprising:
   a local oscillator configured to provide a carrier wave;
   a transmit path including a transmit signal generation device configured to generate a transmit signal based on the carrier wave an input signal, and a transmitter configured to transmit said transmit signal;
   a receiver configured to receive a backscatter modulated receive signal in response to the transmit signal;
   a combiner configured to combine the receive signal with a cancel signal to obtain a corrected receive signal; and
   a processor configured to determine a phase shift and an amplitude adjust from the corrected receive signal and to output the determined phase shift at a first output of the processor and the determined amplitude adjust at a second output of the processor;

wherein the transmit signal generation device comprises a phase shifter coupled to the first output of the processor, which phase shifter is configured to apply the determined phase shift received over the first output as a phase rotation in the transmit path; and wherein an attenuator is coupled to the second output of the processor and configured to generate the cancel signal based on the un-shifted carrier wave and the determined amplitude adjust received over the second output.

9. The RFID reader according to claim 8, wherein the transmit signal generation device is configured to receive an in-line and a quadrature input.

10. The RFID reader according to claim 9, wherein the phase shifter is configured to apply the determined phase shift by phase rotating the in-line and quadrature inputs of the transmit signal generation device.

11. The RFID reader according to claim 10, wherein the phase shifter is embodied as a processor, which is configured to digitally rotate the in-line and quadrature inputs of the transmit signal generation device.

12. The RFID reader according to claim 8, wherein the phase shifter is configured to perform the phase rotation by phase rotating the carrier wave provided by the local oscillator to generate a phase-shifted carrier wave, and a modulator is configured to generate the transmit signal by modulating the phase-shifted carrier wave with the input signal.

13. The RFID reader according to claim 8, wherein the transmit signal generation device comprises a modulator, which is configured to generate the transmit signal by modulating the carrier wave with the input signal to obtain a provisional transmit signal, and the phase shifter is configured to perform the phase rotation by phase rotating the provisional transmit signal to obtain the transmit signal.

14. The RFID reader according to claim 8, further comprising an amplifier that is configured to amplify the transmit signal after the phase rotation is applied and before the transmit signal is transmitted.

15. The RFID reader according to claim 8, wherein a downconverter is arranged between the combiner and the processor, wherein the downconverter is configured to receive the carrier wave from the local oscillator or the phase shifted carrier wave from the phase shifter to downconvert the corrected receive signal.

* * * * *